United States Patent Office 2,897,229
Patented July 28, 1959

2,897,229

PHENYL ACETONITRILE COMPOUNDS AND A PROCESS OF MAKING SAME

Werner Stuehmer, Eldagsen, near Hannover, and Siegfried Funke, Hannover, Germany, assignors to Kali-Chemie Aktiengesellschaft, Hannover, Germany, a stock company No Drawing. Application February 8, 1955
Serial No. 486,978

Claims priority, application Germany February 9, 1954

4 Claims. (Cl. 260—465)

The present invention relates to new and valuable therapeutically effective amino nitrile compounds and more particularly to new phenyl acetonitrile compounds and to a process of making same.

Alkylation of the methylene group of benzyl cyanide, i.e., of phenyl acetonitrile, for instance, by means of alkyl halogenides in the presence of sodium amide yields $\alpha$-substituted mono- or, respectively, dialkylated phenyl acetonitriles of the Formulas I and II, respectively.

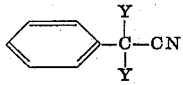

I: X=H; Y=alkyl
II: X=Y=alkyl

Amino alkylation of the free methylene group of phenyl acetonitrile can be carried out in an analogous manner. For instance, phenyl acetonitrile and $\beta,\beta'$-dihalogeno alkylamines yield, with simultaneous ring closure, new piperidine derivatives of Formula III wherein Z is hydrogen or an alkyl radical. Said compounds can readily be converted into analgetically highly effective compounds, such as the hydrochloride of the ethyl ester of 1-methyl-4-phenyl piperidine-4-carboxylic acid of Formula IV known as meperidine hydrochloride U.S.P.

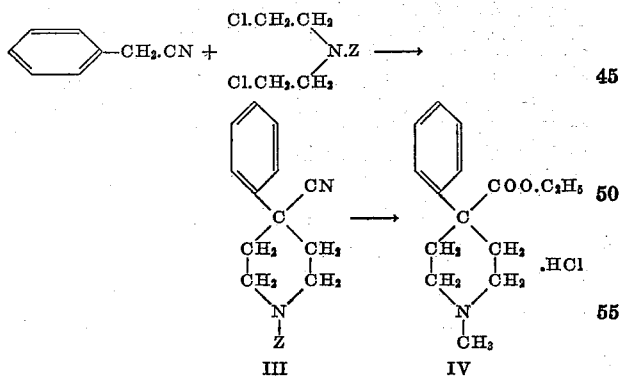

$\alpha$-n-Hexyl phenyl acetonitrile of Formula V, a compound which contains one center of asymmetry reacts in like manner with $\beta$-diethylamino ethyl chloride and forms thereby the corresponding amino nitrile of Formula VI.

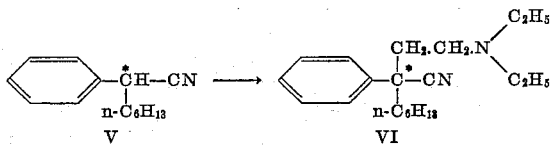

Similar compounds have been produced by reacting, for instance, $\alpha$-isobutyl phenyl acetonitrile, a compound having also only one center of asymmetry and corresponding to Formula VII, in the presence of sodium amide with $\beta$-dimethylamino ethyl chloride, $\beta$-diethylamino ethyl chloride, and $\beta$-piperidino ethyl chloride. In this manner the hydrochlorides of $\alpha$-isobutyl-$\alpha$-($\beta$-dimethylamino ethyl) phenyl acetonitrile of Formula VIII, $\alpha$-isobutyl-$\alpha$-($\beta$-diethylamino ethyl) phenyl acetonitrile of Formula IX, and $\alpha$-isobutyl-$\alpha$-($\beta$-piperidino ethyl) phenyl acetonitrile of Formula X, respectively, are obtained in a good yield.

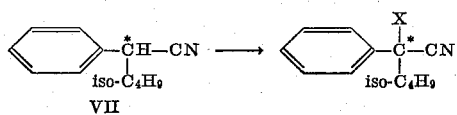

VIII: X=CH$_2$.CH$_2$.N(CH$_3$)$_2$
IX: X=CH$_2$.CH$_2$.N(C$_2$H$_5$)$_2$
X: X=CH$_2$.CH$_2$.N.C$_5$H$_{10}$

Heretofore, however, diastereomeric, $\alpha$-alkyl substituted aryl acetonitriles having two centers of asymmetry have not been produced.

It is one object of the present invention to provide new and valuable diastereomeric, basically substituted, $\alpha$-dialkyl aryl acetonitrile compounds which possess good analgetic properties and, at the same time exhibit spasmolytic activity.

Another object of the present invention is to provide new and valuable therapeutically effective combination preparations comprising such diastereomeric, basically substituted, $\alpha$-di-alkyl aryl acetonitrile in combination with other therapeutically effective compounds, such as antipyretic, sedative, hypnotic agents and the like, said combination preparations exhibiting a synergistic effect and being of considerably increased activity over that of the components of said combination preparations when administered separately.

A further object of the present invention is to provide a simple and effective process of producing said new diastereomeric, basically substituted, $\alpha$-di-alkyl aryl acetonitrile compounds.

Other objects of the present invention and advantageous features thereof will become apparent as the description proceeds.

Diastereomeric, basically substituted, $\alpha$-di-alkyl aryl acetonitrile compounds according to the present invention correspond to the following Formula XI

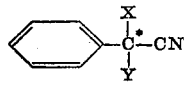

XI

In said formula:

—Ċ— is a quaternary, asymmetric carbon atom,

X is an alkyl group, and
Y is an alkyl group substituted by a basic group, one of said X and Y having a second asymmetric carbon atom.

Said new diastereomeric $\alpha$-di-alkyl substituted phenyl acetonitriles having two asymmetric carbon atoms and a basic group in their molecule are very readily produced by condensing, for instance, diastereomeric $\alpha$-monoalkyl substituted phenyl acetonitriles having two asymmetric carbon atoms in their molecule, with halogeno alkylamines, preferably in the presence of alkali amides.

Another process of producing such diastereomeric $\alpha$-di-alkyl substituted phenyl acetonitriles having two asymmetric carbon atoms and a basic group in their molecule comprises condensing a diastereomeric $\alpha$-alkyl substituted phenyl acetonitrile having two asymmetric carbon atoms in its molecule with alkyl dihalogenides in the presence of an alkali amide and subsequently reacting the resulting diastereomeric halogeno nitrile compound with a secondary amine to yield the same diastereomeric basically substituted α-di-alkyl phenyl acetonitrile as obtained according to the first mentioned process.

It is, of course, also possible to produce diastereomeric α-di-alkyl substituted phenyl acetonitriles having a basic group and two asymmetric carbon atoms in their molecule whereby one of said asymmetric carbon atoms is present in the alkyl substituent carrying the basic group, by condensing an α-monoalkyl substituted phenyl acetonitrile with only one asymmetric carbon atom with a halogeno alkylamine having an asymmetric carbon atom, preferably in the presence of an alkali amide, or by first reacting said α-monoalkyl substituted phenyl acetonitrile with an alkyl dihalogenide having an asymmetric carbon atom and then converting the resulting diastereomeric halogeno nitrile compound into the corresponding amino nitrile compound by reaction with a secondary amine.

These processes of producing the new compounds according to the present invention are illustrated by the following equations:

A.

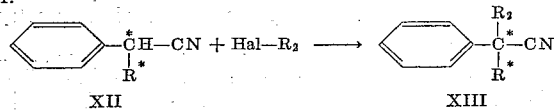

B.

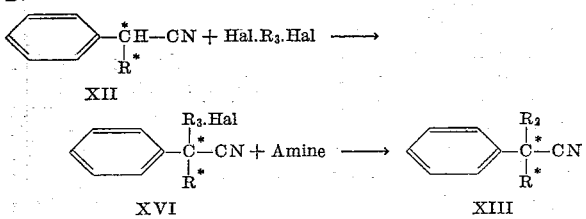

C.

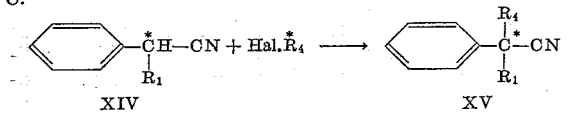

D.

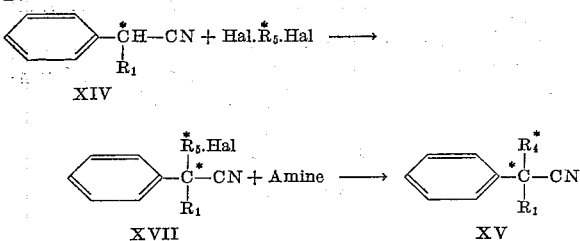

In these formulas:

R* is an alkyl radical with an asymmetric carbon atom,
$R_1$ is an alkyl radical free of asymmetric carbon atoms,
$R_2$ is an alkyl radical substituted by a basic group free of asymmetric carbon atoms,
$R_3$ is an alkylene radical free of asymmetric carbon atoms,
$R_4$ is an alkyl radical substituted by a basic group and having an asymmetric carbon atom, and
$R_5$ is an alkylene radical having an asymmetric carbon atom, while
Hal is halogen.

The resulting amino nitriles according to the present invention can readily be converted into well crystallizing acid addition salts by reaction with inorganic and organic acids, such as hydrochloric acid, tartaric acid, maleic acid, and others.

It is very surprising and entirely unexpected that amino alkylation of diastereomeric α-monoalkyl substituted phenyl acetonitriles of Formula XII, i.e. of compounds containing two asymmetric carbon atoms, yields basically substituted diastereomeric α-di-alkyl phenyl acetonitriles of Formula XIII which do not only possess excellent analgetic properties but exhibit also considerable spasmolytic activity.

According to an especially valuable embodiment of the present invention valuable analgetic and, at the same time, spasmolytic agents of the α-di-alkyl phenyl acetonitrile series are obtained when introducing the second center of asymmetry into their molecule not by means of the alkyl group R* but by means of the basically substituted alkyl group $R_4$* (Formula XV). Especially pronounced are said analgetic and spasmolytic properties in derivatives of α-isopropyl phenyl acetonitrile of Formula XIV wherein $R_1$ is an isopropyl radical.

These new basically substituted diastereomeric α-di-alkyl phenyl acetonitrile compounds of Formula XV having two asymmetric carbon atoms in their molecule, one of said asymmetric carbon atoms being present in the basically substituted alkyl group, are produced according to processes illustrated above by Equations C and D, respectively, and corresponding to the processes illustrated above by Equations A and B, respectively.

The preferred process comprises condensing, according to Equation C, an α-monoalkyl substituted phenyl acetonitrile of Formula XIV having only one asymmetric carbon atom in its molecule with a halogeno alkylamine also containing an asymmetric carbon atom, preferably in the presence of an alkali amide.

In this manner, for instance, α-isopropyl phenyl acetonitrile of Formula XIV wherein $R_1$ is the isopropyl radical, is reacted with 3-N-diethylamino-2-chloro propane in the presence of sodium amide and yields the corresponding amino nitrile of Formula XV, wherein $R_1$ is the isopropyl radical and $R_4$* is the 2-N-diethylamino-1-methyl ethyl group, namely, the diastereomeric α-isopropyl-α-(2-N-diethylamino-1-methyl ethyl) phenyl acetonitrile. The hydrochloride of said new compound is readily soluble in water. The compound is only slightly toxic. It exhibits analgetic properties in tests with white mice in a dosage of 50 mg. per kg. on subcutaneous administration. It has a high spasmolytic activity as can be demonstrated in tests of abolishing spasms induced on isolated guinea pig intestines by means of carbaminoyl choline chloride known as Carbachol. In these test objects it is spasmolytically effective in a mean effective concentration of $8.0–9.0 \times 10^{-8}$, i.e. in a concentration between 0.08 γ/cc. and 0.09 γ/cc., and abolishes spasms induced by means of barium chloride in a mean effective concentration of $5 \times 10^{-6}$, i.e. in a concentration of 5 γ/cc.

It is, of course, also possible first to react, according to Equation D, α-isopropyl phenyl acetonitrile of Formula XIV, for instance, with 1-chloro-2-bromo propane to form α-isopropyl-α-(2-chloro-1-methyl ethyl) phenyl acetonitrile which is then reacted with diethylamine yielding the same diastereomeric α-isopropyl-α-(2-N-diethylamino-1-methyl ethyl) phenyl acetonitrile as obtained by the process according to Equation C.

The following examples serve to illustrate the present invention without, however, limiting the same thereto.

EXAMPLE 1

α-Isopropyl-α-(2-N-diethylamino-1-methyl ethyl) phenyl acetonitrile hydrochloride (Formula XV: $R_1$=iso-$C_3H_7$; $\overset{*}{R_4}$=—$\overset{*}{C}H(CH_3).CH_2.N(C_2H_5)_2$)

50 cc. of benzene and 12 g. of α-isopropyl phenyl acetonitrile (Formula XIV: $R_1$=iso-$C_3H_7$) are added to 3.75 g. of sodium amide. The mixture is heated to boiling under reflux for one hour, while stirring. After cooling, 13 g. of 3-N-diethylamino-2-chloro propane, dissolved in a small amount of benzene, are added thereto and the mixture is heated to boiling for four hours, while stirring. After reaction is completed, water is added to the resulting reaction mixture and the benzene solution is separated from the aqueous layer. Said benzene solution is twice extracted by shaking with 4 N hydrochloric acid, and the separated acid solution is rendered alkaline by the addition of 30% alkali hydroxide solution. The precipitated oil is dissolved in ether, the ethereal solution is dried over anhydrous sodium sulfate, and the ether is distilled off. The remaining amino nitrile is distilled in a vacuum. Its boiling point is 148–151° C./3 mm. Its hydrochloride melts at 139–143° C. It is readily soluble in water.

EXAMPLE 2

*α-Isopropyl-α-(1-methyl-2-N-dimethylamino ethyl) phenyl acetonitrile tartrate*

(Formula XV: $R_1$=iso-$C_3H_7$; $R_4$=–CH($CH_3$).$CH_2$.N($CH_3$)$_2$)

50 cc. of benzene and 12 g. of α-isopropyl phenyl acetonitrile (Formula XIV: $R_1$=iso-$C_3H_7$) are added to 3.75 g. of sodium amide. The mixture is heated to boiling for one hour while stirring. 11 g. of 3-N-dimethylamino-2-chloro propane, dissolved in a small quantity of benzene are added thereto and the mixture is heated to boiling for four hours while stirring. The reaction mixture is worked up in the same manner as described in Example 1. The resulting amino nitrile has a boiling point of 130–133° C./4 mm. Its readily water soluble tartrate, on recrystallization from ether, melts at 68–70° C.

In place of the hydrochlorides and the tartrates of the new diastereomeric α-di-alkyl phenyl acetonitriles having two asymmetric carbon atoms in their molecule and one of their alkyl groups being substituted by a basic group, there can be produced other inorganic and organic acid addition salts of said compounds, such as the hydrobromides, sulfates, phosphates, nitrates, perchlorates, acetates, formates, propionates, benzoates, phthalates, phenyl acetates, oxalates, maleates, lactates, malates, malonates, citrates, succinates, cinnamates, nicotinates, and others. It is understood, of course, that for therapeutical purposes only such acid addition salts are suitable which are substantially non-toxic and well compatible to the human body in the concentrations employed. For purification of the oil diasteromeric amino nitriles there may be used, however, also other acid addition salts which readily crystallize.

In place of sodium amide which has proved to be the most preferred condensing agent, there may be used other condensing agents, such as potassium amide.

In place of benzene used as solvent in the preceding examples there may be employed other substantially anhydrous solvents, such as toluene.

The reaction is preferably carried out at elevated temperature and more advantageously at the boiling temperature of benzene, the most preferred solvent. Lower temperatures may also be used and it is possible to operate under pressure.

Of course, many other changes and variations in the reaction components, the reaction conditions, temperature and duration, the solvents used, the methods of working up the reaction mixture and of isolating and purifying the reaction products and the like may be made by those skilled in the art in accordance with the principles set forth herein and in the claims annexed hereto.

As stated above, the new diastereometric α-di-alkyl phenyl acetonitrile compounds having two asymmetric carbon atoms in their molecule and one of their alkyl groups being substituted by a basic group, and their acid addition salts have proved to be excellent analgetic and spasmolytic agents. They are administered orally in the form of tablets, pills, lozenges, sirups, and the like preparations. Aqueous solutions of their salts with physiologically compatible and non-toxic acids can be administered by injection. They are well tolerated and do not cause any local irritation.

For therapeutical administration, the new diastereomeric basically substituted α-di-alkyl phenyl acetonitrile compounds and their acid addition salts are preferably diluted with a suitable pharmaceutical carrier. Such a carrier may either be a solid material or an injectable liquid such as water or physiological salt solution. As solid carrier there are employed substances as they are used in making tablets, pills, lozenges, dragees, and the like preparations which are administered orally. One may also produce emulsions or suspensions of said active compound in water by means of emulsifying or dispersing agents; for instance, sirupy preparations containing said compounds finely dispersed therein may be prepared. The new compounds may furthermore be employed in the form of powders filled into gelatine capsules or the like. Such powders may be diluted by milling and mixing the phenyl acetonitrile compound with a solid pulverulent extending agent to the desired degree of fineness or by impregnating the already milled, finely powdered, solid carrier with a solution of an acid addition salt of said compound in water or with a solution of the base itself in an organic solvent, such as dioxane, ether, alcohol and others, and then removing the water or solvent.

When preparing tablets, pills, dragees and the like preparations, are commonly used diluting agents, binders, and the like are employed, such as sugar, lactose, talcum, starch, bolus alba, pectin, and as binders, gelatin, gum arabic, methyl cellulose, yeast extract, agar, tragacanth, and others.

The new diastereomeric α-di-alkyl phenyl acetonitriles having two asymmetric carbon atoms in their molecule and one of their alkyl radicals being substituted by a basic group, as stated above, are especially valuable in combination with known antipyretic-analgetic agents, such as pyrazolone derivatives, derivatives of anilin and amino phenol, and salicylates, as well as with known hypnotics and sedatives of the barbiturate series. Such combinations are distinguished by their considerably increased effect, far surpassing the expected combination effect. Thus, it is possible, for instance, to reduce the dose of aminopyrine, also known as Pyramidon, so that the danger that said valuable drug of the pyrazolone series might cause agranulocytosis is almost completely eliminated. Both drugs, the new amino nitrile compound according to the present invention and the known aminopyrine combined, assist each other in their analgetic effects and yield a combination preparation of surprising effectiveness in many cases where, heretofore, the pyrazolone derivatives alone were given. Similar improvement in effectiveness is achieved by combining the new amino nitriles with other pyrazolone derivatives of which the following may be mentioned:

1-phenyl-2,3-dimethyl-5-pyrazolone, known as Antipyrin,
1-phenyl-2,3-dimethyl-5-pyrazolone-4-methylamino methane sulfonic acid in the form of its sodium salt, known as Novalgin,
1-phenyl-2,3-dimethyl-5-pyrazolone-4-amino methane sulfonic acid in the form of its sodium salt, known as Melubrin, and others.
Likewise combinations with Acetanilide, known as antifebrin,
4-ethoxy acetanilide or aceto phenetidine, known as phenacetin,
N-amino acetyl phenetidine known as Phenocol,
N-lactyl phenetidine known as Lactophenin, and others, have proved of high activity.

Combinations of the new amino nitriles with barbiturates are especially valuable since, due to the synergistic action of the new combination, they permit considerable reduction in the doses of such barbiturates and of the new compounds. Among the useful barbiturates there may be mentioned the following without, however, being limited thereto:

5,5'-diethyl barbituric acid known as barbital,
5-ethyl-5'-phenyl barbituric acid known as phenobarbital,
5-allyl-5'-isopropyl barbituric acid known as Alurate,
5-ethyl-5'-isoamyl barbituric acid known as Amytal,
5-ethyl-5'-cyclohexenyl barbituric acid known as Phanodorm,
5-(1-methyl butyl)-5'-ethyl barbituric acid known as pentobarbital,
1,5-dimethyl-5'-cyclohexenyl barbituric acid known as Evipal,
5-allyl-5'-(1-methyl butyl) barbituric acid known as Seconal,
and others.

Combinations containing the new amino nitriles together with barbiturates and pyrazolone compounds are also of importance, such as combinations containing diethyl barbituric acid and aminopyrine known as Veramon, 5-allyl-5'-isopropyl barbituric acid and aminopyrine known as Allonal, 5,5'-diallyl barbituric acid and aminopyrine known as Cibalgen, or others.

The following examples serve to illustrate the composition of tablets containing such combination preparations without, however, being limited thereto. It is, of course, understood that such combination preparations may also be prepared and administered in the form of pills, lozenges, injectable solutions and the like.

EXAMPLE 3

| | G. |
|---|---|
| α-Isopropyl-(2-N-diethylamino-1-methyl ethyl) phenyl acetonitrile hydrochloride | 2.5 |
| Aceto phenetidine | 35 |
| Pectin | 6.25 |
| Dextrin | 6.25 |
| For 100 tablets @ .0.5 g. each | 50 |

EXAMPLE 4

| | G. |
|---|---|
| α-1-isopropyl-α-(2-N-dimethylamino-1-methyl ethyl) phenyl acetonitrile hydrochloride | 5 |
| 5,5'-diethyl barbituric acid | 10 |
| Aminopyrine | 10 |
| Starch | 10 |
| Methyl cellulose | 5 |
| Talcum | 10 |
| For 100 tablets @ 0.5 g. each | 50 |

Of course, many changes and variations in the composition of said combination preparations, the tableting ingredients, the form in which the combination preparations are prepared and administered, and the like may be made by those skilled in the art in accordance with the principles set forth herein and in the claims annexed hereto.

As stated hereinbefore α-isopropyl-α-(2-N-diethylamino-1-methyl ethyl) phenyl acetonitrile, on subcutaneous administration, exhibits analgesic activity in white mice in a dose of 50 mg./kg. In contrast hereto the isomeric α-isopropyl-α-(γ-diethylamino propyl) phenyl acetonitrile which differs from the above mentioned α-isopropyl-α-(2-N-diethylamino-1-methyl ethyl) phenyl acetonitrile by having only one center of asymmetry, does not exhibit analgesic activity on subcutaneous injection of 50 mg./kg. mouse.

α - Isopropyl - α - (1 - methyl - 2 - N - dimethylamino ethyl) phenyl acetonitrile of Formula XII wherein $R_1$ is isopropyl and $R_4$ is

—ĊH(CH₃).CH₂.N(CH₃)₂ which compound also possesses two centers of asymmetry exhibits, in contrast to its isomeric γ-amino propyl compounds, analgesic properties when subcutaneously administered to mice in a dose of 50 mg./kg.

It is, of course, understood that for subcutaneous administration of the new compounds, when used in combination with barbiturates, antipyretics, and the like, injectable solutions of said compounds are employed which solutions may contain the barbiturate or antipyretic and analgetic agent dissolved therein in the required amounts so that they can be injected simultaneously. Orally administered preparations are preferably used in the form described in Example 4.

We claim:
1. The α - isopropyl - α - (1 - methyl - 2 - N - dimethylamino ethyl) phenyl acetonitrile compounds selected from the group consisting of the α-isopropyl-α-(1-methyl-2-N-dimethylamino ethyl) phenyl acetonitrile of the formula

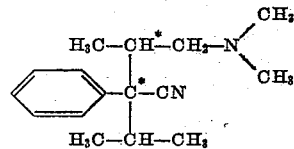

and its acid addition salts wherein * signifies an asymmetric carbon atom.

2. The α - isopropyl - α - (1 - methyl - 2 - N - dimethylamino ethyl) phenyl acetonitrile tartrate of the formula

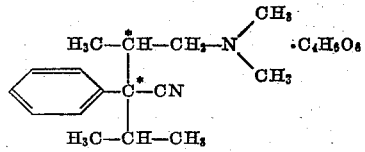

wherein * signifies an asymmetric carbon atom.

3. Diastereomeric α-isopropyl-α-(1-methyl-2-N-dimethylamino ethyl) phenyl acetonitriles.

4. Acid addition salts of diastereomeric α-isopropyl-α-(1-methyl-2-N-dimethylamino ethyl) phenyl acetonitriles.

References Cited in the file of this patent
UNITED STATES PATENTS

| 2,542,466 | Blicke | Feb. 20, 1951 |
| 2,566,535 | Ruddy | Sept. 4, 1951 |
| 2,570,286 | Surrey et al. | Oct. 9, 1951 |
| 2,607,794 | Chamberlin et al. | Aug. 19, 1952 |
| 2,666,050 | Diamond et al. | Jan. 12, 1954 |
| 2,675,341 | Shelanski | Apr. 13, 1954 |
| 2,678,296 | Cunningham | May 11, 1954 |

OTHER REFERENCES

Wood: U.S. Dispensatory, 23d edition (1943), pp. 9 and 1274.